United States Patent [19]
Heilig

[11] Patent Number: 5,772,241
[45] Date of Patent: Jun. 30, 1998

[54] ASSEMBLY COMPRISING A STEERING WHEEL, A STEERING SHAFT AND A GAS BAG MODULE

[75] Inventor: Alexander Heilig, Wissgolldingen, Germany

[73] Assignee: TWX Occupant Restraint Systems GmbH, Alfdorf, Germany

[21] Appl. No.: 833,777

[22] Filed: Apr. 9, 1997

[30] Foreign Application Priority Data

Apr. 15, 1996 [DE] Germany ................... 296 06 830 U

[51] Int. Cl.⁶ .................................................. B60R 21/26
[52] U.S. Cl. ...................................... 280/731; 280/728.2
[58] Field of Search ............................... 280/731, 728.2, 280/741, 736

[56] References Cited

U.S. PATENT DOCUMENTS

| | | | |
|---|---|---|---|
| 3,822,894 | 7/1974 | Muller et al. | 280/731 |
| 3,945,665 | 3/1976 | Tsutsumi et al. | 280/731 |
| 5,342,089 | 8/1994 | Fink et al. | 280/731 |
| 5,511,818 | 4/1996 | Jarboe et al. | 280/728.2 |
| 5,553,888 | 9/1996 | Turner et al. | 280/731 |
| 5,655,789 | 8/1997 | Kreuzer | 280/731 |
| 5,700,031 | 12/1997 | Heilig et al. | 280/731 |

FOREIGN PATENT DOCUMENTS

| | | | |
|---|---|---|---|
| 615889 | 9/1994 | European Pat. Off. | 280/731 |
| 2360390 | 7/1974 | Germany | 280/731 |
| 9407808 | 7/1994 | Germany . | |
| 2293799 | 4/1996 | United Kingdom . | |

*Primary Examiner*—Christopher P. Ellis
*Attorney, Agent, or Firm*—Tarolli, Sundheim, Covell, Tummino & Szabo

[57] ABSTRACT

An assembly is provided, comprising a steering wheel, a steering shaft connected non-rotatably to the steering wheel, a gas bag arranged within the steering wheel and having an inflation opening provided with a rim, and a device adapted for furnishing compressed gas for deployment of the gas bag. The device for furnishing compressed gas is arranged in the steering shaft and is fixed against movement in an axial direction of the steering shaft by means of a carrier plate arranged within the steering wheel. The carrier plate also secures the gas bag rim to the steering wheel.

12 Claims, 4 Drawing Sheets

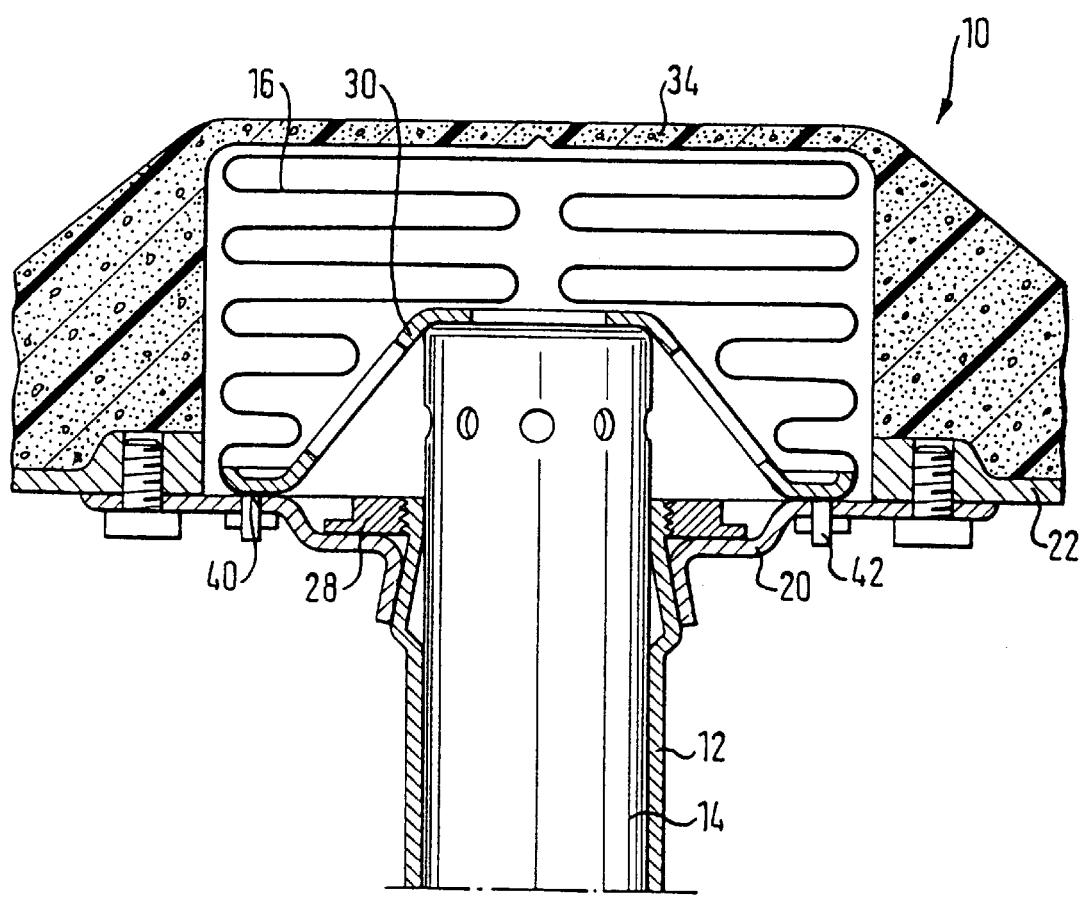

ASSEMBLY COMPRISING A STEERING WHEEL, A STEERING SHAFT AND A GAS BAG MODULE

TECHNICAL FIELD

The invention relates to an assembly comprising a steering wheel, a steering shaft and a gas bag module.

BACKGROUND OF THE INVENTION

From German utility model 295 16 621, an assembly is known which comprises a steering wheel, a steering shaft connected non-rotatably to the steering wheel, and a device for furnishing compressed gas for deployment of a gas bag arranged in the interior of the steering wheel.

The invention provides an assembly of a steering wheel, a steering shaft and a gas bag module, which can be mounted particularly simple. According to the invention, the assembly comprises a steering wheel, a steering shaft connected non-rotatably to the steering wheel, a gas bag arranged within the steering wheel and having an inflation opening provided with a rim, and a device adapted for furnishing compressed gas for deployment of the gas bag. The device for furnishing compressed gas is arranged in the steering shaft and is fixed against movement in an axial direction of the steering shaft by means of a carrier plate arranged within the steering wheel. The carrier plate also secures the gas bag rim to the steering wheel. Due to this dual function of the carrier plate, a particularly simple configuration of the assembly according to the invention materializes. In addition, advantages materialize in fitting this assembly.

Advantageous embodiments of the invention are set forth in the sub-claims.

BRIEF DESCRIPTION OF THE DRAWINGS

The invention will now be described on the basis of two embodiments, illustrated in the attached drawing, in which:

FIG. 3 is a schematic illustration of a cross-section through an assembly in accordance with a second embodiment of the invention and FIGS. 4a to 4d are schematic illustrations of various partial views of three variants of a carrier plate for the assembly shown in FIG. 3.

DETAILED DESCRIPTION OF THE INVENTION

Figure 1:
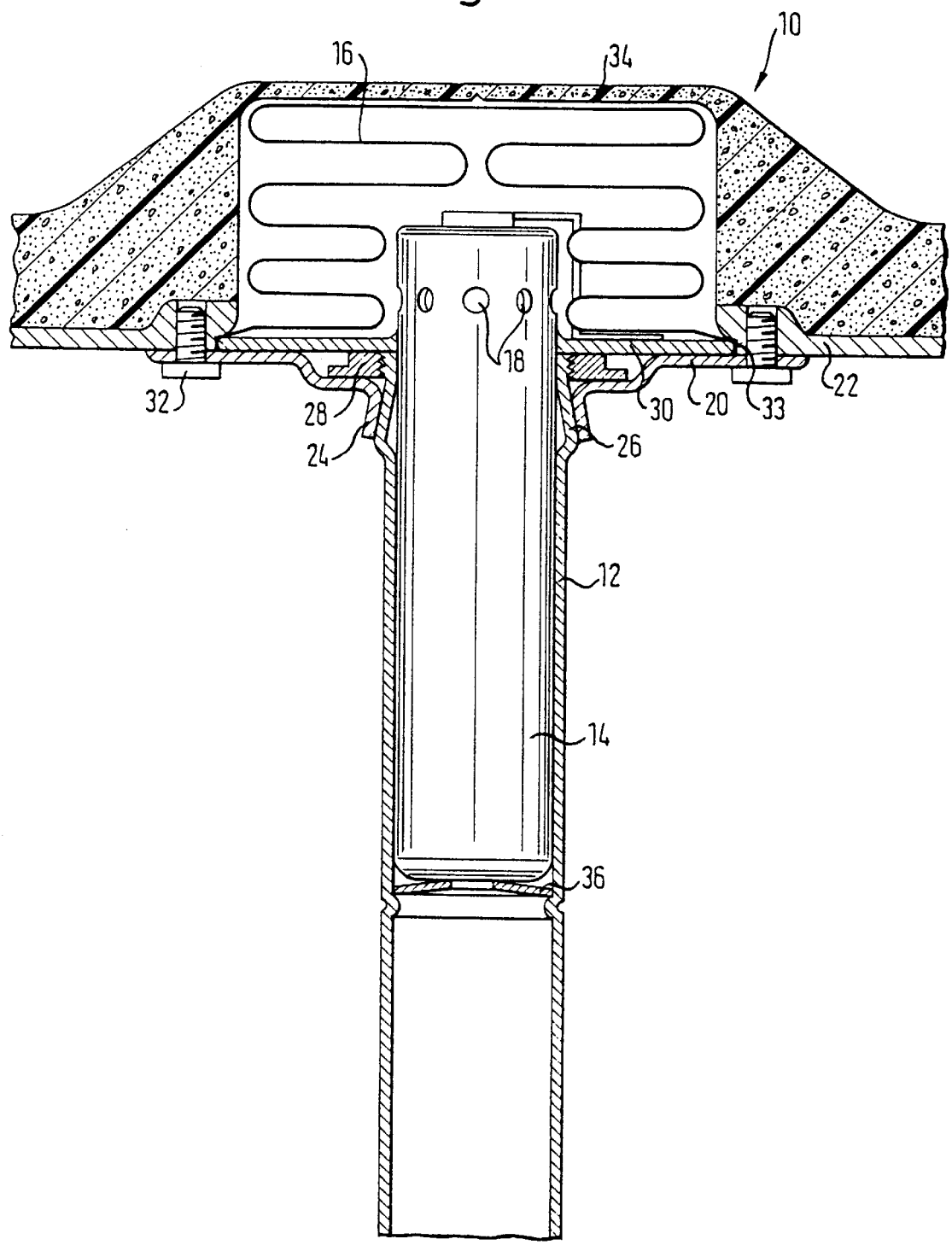
FIG. 1 is a schematic illustration of a cross-section through an assembly in accordance with a first embodiment of the invention.

In FIG. 1 an assembly in accordance with a first embodiment of the invention is illustrated. The assembly consists of a steering wheel generally connotated by the reference numeral 10, a steering shaft 12 connected non-rotatably to the steering wheel 10, and a device 14 arranged in the interior of the steering shaft 12 and capable of furnishing a predetermined amount of compressed gas for deployment of a gas bag 16 arranged in the interior of the steering wheel 10, the gas discharging from the gas generator 14 through orifices 18 arranged at its axial end on the steering wheel side. Such a device may be in particular a gas generator 14 or a compressed gas container.

The steering wheel 10 consists of a mounting plate 20 and a steering wheel body 22 sheathed with foam. The mounting plate 20 is provided with a flange 24 which is slipped onto a complementary formed end 26 of the steering shaft 12. Fastening of the mounting plate 20 to the steering shaft 12 may be by means of a nut 28 in a fashion as disclosed in German utility model 295 16 623.

The gas generator 14 inserted into the steering shaft 12 is provided with a carrier plate 30 configured as a radially extending flange and fixedly connected to the gas generator 14. The outer peripheral rim of the carrier plate 30 is firmly clamped between the mounting plate 20 and the steering wheel body 22, the mounting plate and the steering wheel body being connected to each other by screws 32. The carrier plate 30 is located substantially in a receiving opening 33 of the steering wheel body 22. At the same time, the rim section of the inflation orifice of the gas bag 16 is firmly clamped between the outer peripheral rim of the carrier plate 30, the mounting plate 20 and steering wheel body 22.

Due to this configuration, a particularly simple and efficient installation of the assembly as a whole is achievable. As an example, first the mounting plate 20 is screwed to the steering shaft 12. If desired, a spring washer 36 may also be inserted in the steering shaft 12, which together with the carrier plate 30 contributes towards locating the gas generator 14. Then, a preassembled unit may be inserted into the steering shaft 12, this unit comprising the gas generator 14, the carrier plate 30 and the gas bag 16, the inflation orifice of which is slipped over the carrier plate 30. Finally, the steering wheel body 22 is mounted so that the gas bag 16 is located in the interior of the steering wheel behind a gas bag cover 34 foamed in place integrally with the steering wheel. All that then needs to be done is to screw the steering wheel body 22 to the mounting plate 20.

Figure 2:
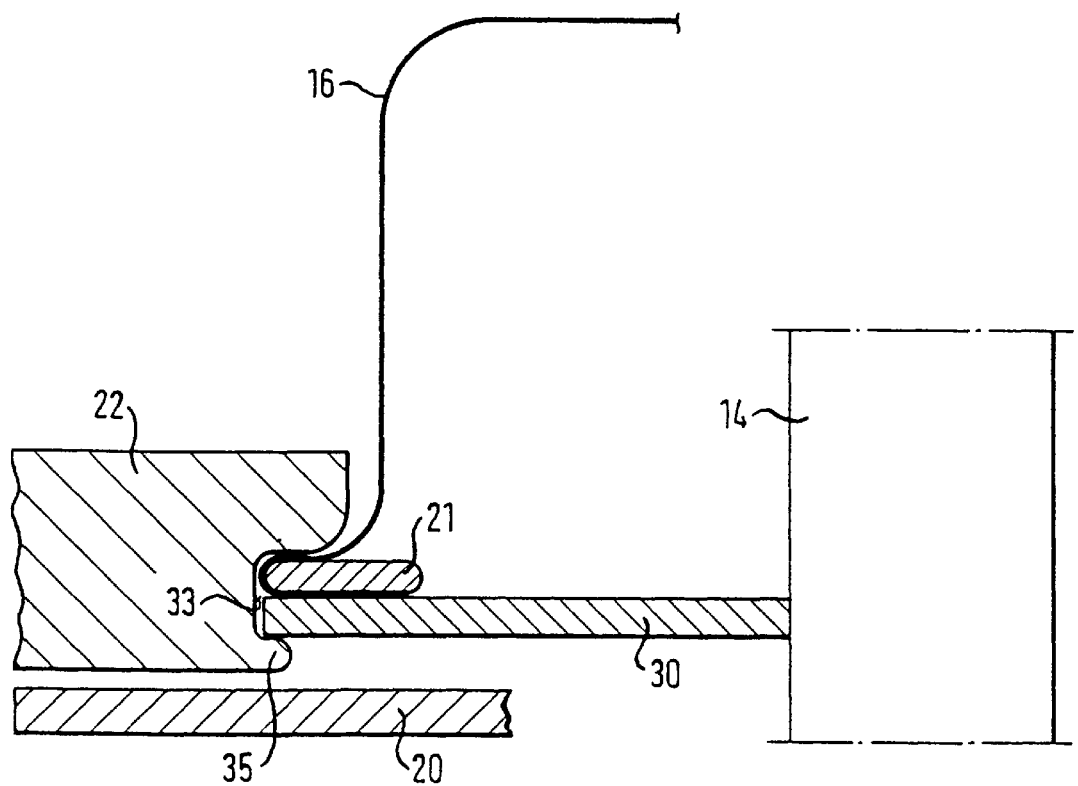
FIG. 2 is a schematic illustration of a variant of the embodiment shown in FIG. 1.

FIG. 2 illustrates schematically a variant of the first embodiment of the invention. The difference to the embodiment illustrated in FIG. 1 consists of a ring 21 being inserted in the prefolded gas bag 16. On installation of the assembly, first the gas bag 16 together with the ring 21 is inserted in the steering wheel body 22. The gas generator 14 is then inserted with its carrier plate 30 into the receiving opening 33 of the steering wheel body 22. Subsequently, suitable pressed sites 35 are formed on the steering wheel body 22 by a partial deformation of the outer peripheral rim of the receiving opening 33, these press sites serving to permanently connect the carrier plate 30, the gas generator 14 and the gas bag 16 along with its ring 21 to the steering wheel body 22 so that a preassembled unit is formed. Finally, the steering wheel body 22 is screwed to the mounting plate 20.

In FIG. 3, an assembly in accordance with a second embodiment of the invention is shown. It is to be noted that for the elements of this assembly known from FIG. 1, the same reference numerals are used, and reference is made to the corresponding explanations regarding FIG. 1.

Figure 4A:
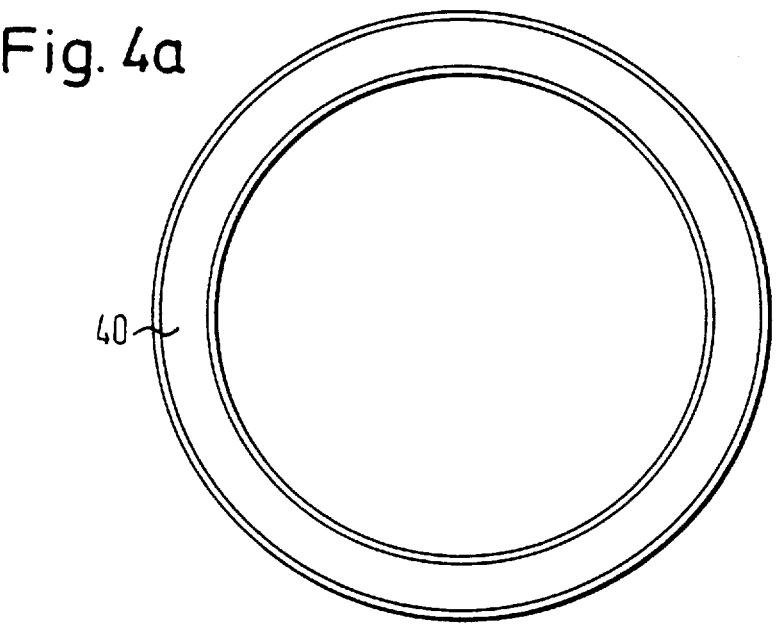
Figure 4B:
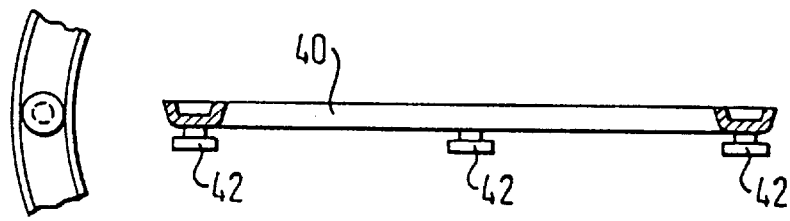
Figure 4C:
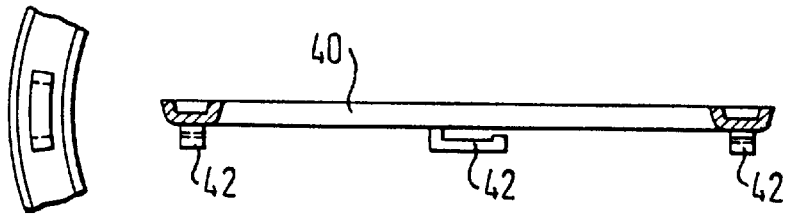
Figure 4D:
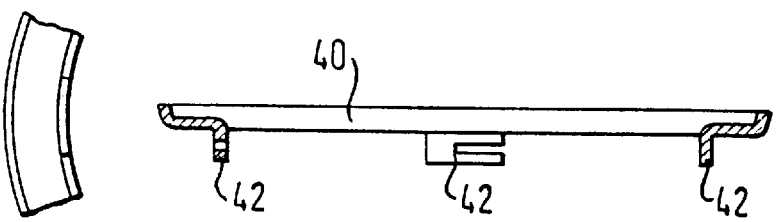

In this embodiment of the assembly, the carrier plate 30 is configured cup-like, and the end face of the gas generator 14, which is directed towards the steering wheel, is in contact with the bottom of the cup-like carrier plate 30 on the inside thereof. The outer peripheral rim 40 of the cup-like carrier plate 30 is connected to the mounting plate 20 by a bayonet lock. Possible configurations of such a bayonet lock for the carrier plate 30 are illustrated in the FIGS. 4a to 4d. In FIG. 4a, the peripheral rim 40 of the carrier plate 30 is illustrated schematically. On the lower side (see FIGS. 4b to 4d), latching elements 42 are arranged. In the variant shown in FIG. 4b, these latching elements take the form of pins arranged on the peripheral rim 40 and including a faceplate which is engagable in complementary openings of the mounting plate 20. In the variant illustrated in FIG. 4c, the latching elements 42 consist of hooks arranged on the peripheral rim 40, and in the variant illustrated in FIG. 4d, the latching elements 42 consist of hooks formed on the inner rim of the peripheral rim 40. In the second embodiment too, the carrier plate 30 is used to fix both the gas generator 14 and the gas bag 16. In this embodiment, the carrier plate 30 must be latched to the mounting plate 20 prior to the steering wheel body 22 being placed thereon.

I claim:

1. An assembly comprising a steering wheel, a steering shaft connected non-rotatably to said steering wheel, a gas bag arranged within said steering wheel and having an inflation opening provided with a rim, and a device adapted for furnishing compressed gas for deployment of said gas bag, said device for furnishing compressed gas being arranged in said steering shaft and being fixed against movement in an axial direction of said steering shaft by means of a carrier plate arranged within said steering wheel, said carrier plate securing said gas bag rim to said steering wheel.

2. The assembly of claim 1, wherein said steering wheel is constituted by a mounting plate connected to said steering shaft, and a steering wheel body, said mounting plate and said steering wheel body being fixedly connected to each other.

3. The assembly of claim 2, wherein said carrier plate is clamped between aid mounting plate and said steering wheel body.

4. The assembly of claim 2, wherein said carrier plate is screwed to said counting plate.

5. The assembly of claim 2, wherein said carrier plate is connected to said mounting plate by a bayonet lock.

6. The assembly of claim 1, wherein said carrier plate is configured as radially extending flange and is fixedly connected to said device for furnishing compressed gas.

7. The assembly of claim 1, wherein said carrier plate is configured cup-like, and a face of said device for furnishing compressed gas, which faces said steering wheel, is in contact with a bottom of said cup-like carrier plate on the inside thereof.

8. The assembly of claim 1, wherein said device for furnishing compressed gas is biased elastically towards said steering wheel.

9. The assembly of claim 1, wherein said steering wheel is connected to said steering shaft by a fastening mechanism actuatable from an outer side of said steering wheel.

10. The assemble of claim 2, wherein said rim of said gas bag is clamped between said carrier plate, said mounting plate and said steering wheel body.

11. The assembly of claim 2, wherein a ring is inserted into said inflation orifice of said gas bag, and said ring of said gas bag is clamped between said ring, said carrier plate and said steering wheel body.

12. The assembly of claim 11, wherein said ring is crimped to said steering wheel body.

* * * * *

UNITED STATES PATENT AND TRADEMARK OFFICE
CERTIFICATE OF CORRECTION

PATENT NO : 5,772,241
DATED : June 30, 1998
INVENTOR(S) : Alexander Heilig

It is certified that error appears in the above-identified patent and that said Letters Patent is hereby corrected as shown below:

On title page, item 73 Assignee
 replace "TWX Occupant Restraint Systems GmbH"
 with --TRW Occupant Restraint Systems GmbH--.

Signed and Sealed this

Eighth Day of June, 1999

Attest:

Q. TODD DICKINSON

*Attesting Officer*        *Acting Commissioner of Patents and Trademarks*